(12) United States Patent
Damera-Venkata (10) Patent No.: US 7,187,806 B2
(45) Date of Patent: Mar. 6, 2007

(54) SYSTEM AND METHOD FOR EMBEDDING INFORMATION WITHIN A PRINTED IMAGE USING BLOCK ERROR DIFFUSION HALFTONING

(75) Inventor: Niranjan Damera-Venkata, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1033 days.

(21) Appl. No.: 09/935,457

(22) Filed: Aug. 23, 2001

(65) Prior Publication Data

US 2003/0038181 A1 Feb. 27, 2003

(51) Int. Cl.
*G06K 9/38* (2006.01)
*G06K 9/00* (2006.01)
(52) U.S. Cl. .................................... 382/252
(58) Field of Classification Search ............... 382/100, 382/232, 237, 252, 254, 233, 260, 253, 264; 358/1.9, 3.28; 713/176–178; 380/210; 348/460
See application file for complete search history.

(56) References Cited

U.S. PATENT DOCUMENTS

| 5,091,966 | A | | 2/1992 | Bloomberg et al. ........... 382/21 |
| 5,315,098 | A | | 5/1994 | Tow ........................... 235/494 |
| 5,799,112 | A | * | 8/1998 | de Queiroz et al. ......... 382/254 |
| 6,076,738 | A | | 6/2000 | Bloomberg et al. ......... 235/494 |
| 6,256,398 | B1 | | 7/2001 | Chang |
| 6,356,363 | B1 | * | 3/2002 | Cooper et al. ............... 358/1.9 |
| 6,608,911 | B2 | * | 8/2003 | Lofgren et al. ............. 382/100 |
| 6,690,811 | B2 | * | 2/2004 | Au et al. .................... 382/100 |
| 6,694,041 | B1 | * | 2/2004 | Brunk ......................... 382/100 |
| 6,700,992 | B1 | * | 3/2004 | Yu et al. ..................... 382/100 |
| 6,750,983 | B1 | * | 6/2004 | Miyake ....................... 358/1.9 |
| 6,763,121 | B1 | * | 7/2004 | Shaked et al. .............. 382/100 |

FOREIGN PATENT DOCUMENTS

WO WO 99/60792 11/1999

OTHER PUBLICATIONS

Niranjan Damera-Venkata and Brian L. Evans, "FM Halftoning via Block Error Diffusion", Proc. IEEE Int. Conf. on Image Processing, Oct. 7-10, 2001, Thessaloniki, Greece, to appear.

(Continued)

*Primary Examiner*—Amir Alavi (57) ABSTRACT

A system and method for embedding information within an input image utilizes specific type pixel blocks of the input image to selectively embed the information into the input image. The information is embedded into the input image by replacing the specific type pixel blocks with predefined dot shape blocks, which represent the information to be embedded. In an embodiment, the specific type pixel blocks are minority pixel blocks, which include a majority of pixels that contrast with the image background. The use of minority pixel blocks makes the embedded information less perceptible in the final image. In an embodiment, error diffusion is performed on a pixel block by pixel block basis so that the final image with the embedded information is of high quality and more suitable for printing on laser printers.

21 Claims, 5 Drawing Sheets

OTHER PUBLICATIONS

Zachi Baharav and Doron Shaked, "Watermarking of Dither Hatoned Images", Hewlett-Packard Laboratories Tech Report, TR#HPL.-98-32, 1999.

Daniel Leo Lau, Gonzalo R. Arce and Neal C. Gallagher, "Green Noise Digital Halftoning", Proc. of the IEEE, vol. 86, pp. 2424-2442, Dec. 1998.

Nozaki K et al. "A Large Capacity Steganography Using Color BMP Images" Proceedings of the Asian Conference on Computer Vision 1997 pp. 112-119.

Blundo and De Santis "Visual Cryptography Schemes with Perfect Recostruction of Black Pixels" Comput & Graphic vol. 22 No. 4 pp. 449-445 1998 Elsevier Science Ltd.

* cited by examiner

SYSTEM AND METHOD FOR EMBEDDING INFORMATION WITHIN A PRINTED IMAGE USING BLOCK ERROR DIFFUSION HALFTONING

FIELD OF THE INVENTION

The invention relates generally to the field of image processing, and more particularly to a system and method for embedding information within a printed image.

BACKGROUND OF THE INVENTION

It is often useful to embed information within an image that is not noticeable to a person viewing the image. There are practical applications for embedding information within the image. For example, embedding information representing the name of an employee and his/her social security number within the employee's corresponding identification photograph would not only add a level of security to the information but also could correlate the embedded information with the visual data. In many applications, it is also useful to reproduce this image with embedded information onto a printed, tangible medium for viewing, archiving, and/or transmission to others.

A concern with embedding information within a printed image is that the image quality may be degraded by the embedded information. As an example, the embedded information may introduce significant visual artifacts, which can negatively affect the appearance of the image.

Another concern with embedding information within a printed image is that the embedded information may be compromised when the image with the embedded information is printed. When an image is printed, the image is typically converted into halftones according to a halftoning technique, such as error diffusion halftoning, which is a popular halftoning technique. Error diffusion halftoning technique operates on a dot pixel by dot pixel basis to convert each pixel of an input image into either a white pixel or a black pixel. The error diffusion halftoning technique modulates the frequency of printed pixel dots, i.e., the black pixels, which controls the grayscale in a printed image. In other words, printed pixel dots vary in frequency with respect to the underlying grayscale of the corresponding image to increase or decrease the printed grayscale. When a pixel of the input image is converted to a white pixel or a black pixel, a halftone error is usually introduced. A halftone error is the difference between the original grayscale value associated with a pixel of the input image and the halftone value of the converted pixel. In error diffusion halftoning, the halftone errors are distributed to neighboring pixels. A well-known halftone error distribution scheme is the Floyd and Steinberg error diffusion. Since every pixel of an input image is converted into either a white pixel or a black pixel during the error diffusion halftoning, the information embedded in an image may be altered or distorted by the halftoning process, which may corrupt the embedded information when the image is printed.

In addition to the problem of halftone errors, the error diffusion halftoning technique produce printed images that typically include many isolated dot pixels. In general, inkjet printers are well suited for error diffusion halftoning technique because inkjet printers are capable of faithfully reproducing isolated dots. However, laser printers are not capable of consistently reproducing isolated dot pixels. Therefore, conventional error diffusion halftoning techniques are not suitable for laser printers.

In view of these concerns, there is a need for a system and method for embedding information within a printed image using an error diffusion halftoning technique, which is suitable for laser printers, without significantly degrading the image quality or compromising the embedded information when the image is printed.

SUMMARY OF THE INVENTION

A system and method for embedding information within an input image utilizes specific type pixel blocks of the input image to selectively embed the information into the input image. The information is embedded into the input image by replacing the specific type pixel blocks with predefined dot shape blocks, which represent the information to be embedded. In an embodiment, the specific type pixel blocks are minority pixel blocks, which include a majority of pixels that contrast with an image background. The use of minority pixel blocks makes the embedded information less perceptible in the final image. In an embodiment, error diffusion is performed on a pixel block by pixel block basis so that the final image with the embedded information is of high quality and more suitable for printing on laser printers.

A method in accordance with the invention includes the steps of detecting first type pixel blocks of an input image, which are dependent on pixel values within the first type pixel blocks, and modulating the first type pixel blocks of the input image based on the information to produce an output image. The output image includes the input image and the information.

In an embodiment, the step of modulating the first type pixel blocks of the input image includes replacing the first type pixel blocks of the input image with a plurality of dot shape blocks such that information is represented by the dot shape blocks.

In an embodiment, the step of detecting the first type pixel blocks of the input image includes detecting minority pixel blocks of the input image. Minority pixel blocks are pixel blocks that include a majority of pixels that contrast with an image background. The minority pixel blocks may include a majority of dark pixels or a majority of light pixels.

In an embodiment, the method further includes the step of diffusing halftone errors of each pixel block of the input image into neighboring pixel blocks of the input image on a pixel block by pixel block basis.

A system in accordance with the present invention includes a pixel block type detector that is configured to detect first type pixel blocks of an input image, which are dependent on pixel values within the first type pixel blocks, and a block modulator that is configured to modulate the first type pixel blocks of the input image based on said information to be embedded to produce an output image. The output image includes the input image and the information.

In an embodiment, the block modulator is configured to replace the first type pixel blocks of the input image with dot shape blocks such that the information is represented by the dot shape blocks.

In an embodiment, the pixel block type detector is configured to detect minority pixel blocks of the input image, which are pixel blocks that include a majority of pixels that contrast with an image background. The minority pixels may include a majority of dark pixels or a majority of light pixels.

In an embodiment, the system may further include an error diffusion halftoner coupled to the block modulator. The error diffusion halftoner is configured to diffuse halftone errors of each pixel block of the input image into neighboring pixel blocks of the input image on a pixel block by pixel block basis.

Other aspects and advantages of the invention will become apparent from the following detailed description, taken in conjunction with the accompanying drawings, illustrated by way of example of the principles of the invention.

DETAILED DESCRIPTION

Specific reference is made in detail to the embodiments of the invention, examples of which are illustrated in the accompanying drawings. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

Figure 1:
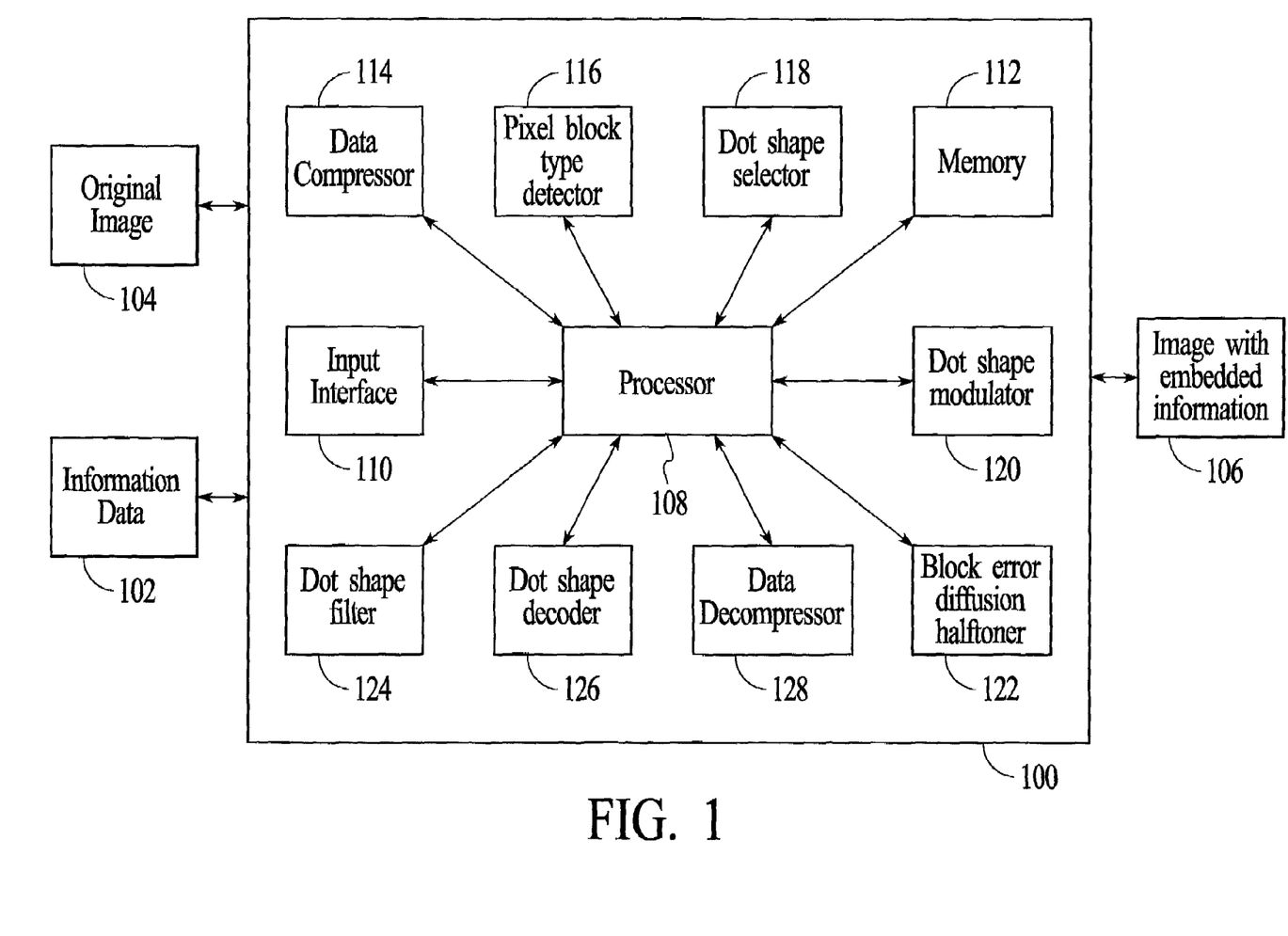
FIG. 1 is a block diagram of a system for embedding information in a printed image and retrieving information from the printed image in accordance with the invention.

With reference to FIG. 1, a system 100 for embedding information into a printed image and for retrieving the embedded information from the printed image according to the present invention is shown. The system operates to reliably embed information data 102 into an original image 104 to produce an output image with embedded information 106 without significantly degrading the original image. In addition, the system operates to reliably retrieve the information data 102 from the output image with embedded information 106 by detecting and filtering out the information data from the output image.

The system 100 includes a processor 108, an input interface 110, and memory 112. The memory 112 may include both volatile and nonvolatile memory. The input interface and the memory are connected to the processor. The processor, the input interface, and the memory of the system are components that are readily found in personal computers. The system further includes a data compressor 114, a pixel block type detector 116, a dot shape selector 118, a dot shape modulator 120 and a block error diffusion halftoner 122, which are also connected to the processor 108. These components 114–122 are used during the information embedding operation of the system. The system further includes a dot shape filter 124, a dot shape decoder 126 and a data decompressor 128, which are also connected to the processor 108. These components 124–128 are used during the information retrieving operation of the system. Although the components 114–128 are illustrated in FIG. 1 as separate components of the system, two or more of these components may be integrated, thus decreasing the number of components within the system. Similarly, one or more of the components 114–128 may be separated, thus increasing the number of components within the system. The components 114–128 may be implemented in any combination of hardware, firmware and software.

In one embodiment, the system 100 receives the original image 104 and the information data 102, which is the information to be embedded into the original image. After processing the original image and the information data, the system outputs the image with embedded information 106. The output image with embedded information appears visually similar to the original image to a viewer, despite the fact that the output image includes the information data and the original image. For retrieving the information data 102 from the output image 106, the system receives the output image with embedded information 106. After processing the output image with embedded information, the system extracts the information data 102 from the output image. Thus, the system can embed information into an original image to produce an output image and then retrieve the embedded information from the output image. However, the system 100 can also extract embedded information from an output image generated by another system, as long as the other system utilizes the same encoding as the system 100.

The input interface 110 provides a means for the system 100 to receive the original image 112 and the information data 102. Further, the input interface also provides a means for the system to receive the image with embedded information 106. The input interface 110 may be a USB port, a serial port, Ethernet port, or any other interface port configured to receive electronic data.

The data compressor 114 of the system 100 operates to compress the information data 102 into a compressed data stream, which has a smaller number of bytes than the original information data 102, without compromising the integrity of the information data.

The pixel block type detector 116 of the system 100 operates to determine whether a current pixel block of the original image 104 is a majority pixel block or a minority pixel block. A pixel block of an image is defined herein as cluster of individual image pixels. An exemplary pixel block is a 4×4 pixel matrix that includes a cluster of sixteen individual pixels. The size of a pixel block may be larger or smaller than the exemplary pixel block. Preferably, a pixel block is a square pixel block. That is, the pixel block includes the same number of pixels in the rows and columns of the pixel block. In general, each pixel of an input image is assigned an intensity value between 0 and 255, with 0 representing black and 255 representing white.

The block error diffusion halftoner 122 of the system 100 operates to convert the pixels within pixel blocks of the original image into halftones and diffuse halftone errors from the pixel blocks of the original image to surrounding pixel blocks in a manner similar to conventional error diffusion halftoning techniques. However, in contrast to the conventional error diffusion halftoning techniques, the block error diffusion halftoner 122 performs error diffusion with respect to pixel blocks instead of individual pixels. The block error diffusion halftoner computes the halftone errors for each pixel block, regardless of whether the pixel block is a minority pixel block or a majority pixel block, and then diffuses the halftone errors of the pixel block to the surrounding pixel blocks using weighted halftone errors according to a known halftone error diffusion scheme, such as the Floyd and Steinberg error diffusion. In an exemplary embodiment, the block error diffusion halftoner averages the halftone errors within a current pixel block and then distributes the weighted error to surrounding pixel blocks such that each pixel in a particular surrounding pixel block is assigned the same weighted halftone error. In other embodiments, the block error diffusion halftoner may utilize more complex error diffusion schemes to distributed halftone errors. Since the dot shapes are designed as clusters of individual halftone dot pixels, the halftone dots of the output image with embedded information 106 will be clustered. Thus, isolated halftone dots are less likely to appear in the output image 106 as a result from the error diffusion. Consequently, a consistent, stable high quality reproduction of the output image with embedded information using a laser printer is possible.

Figure 3:
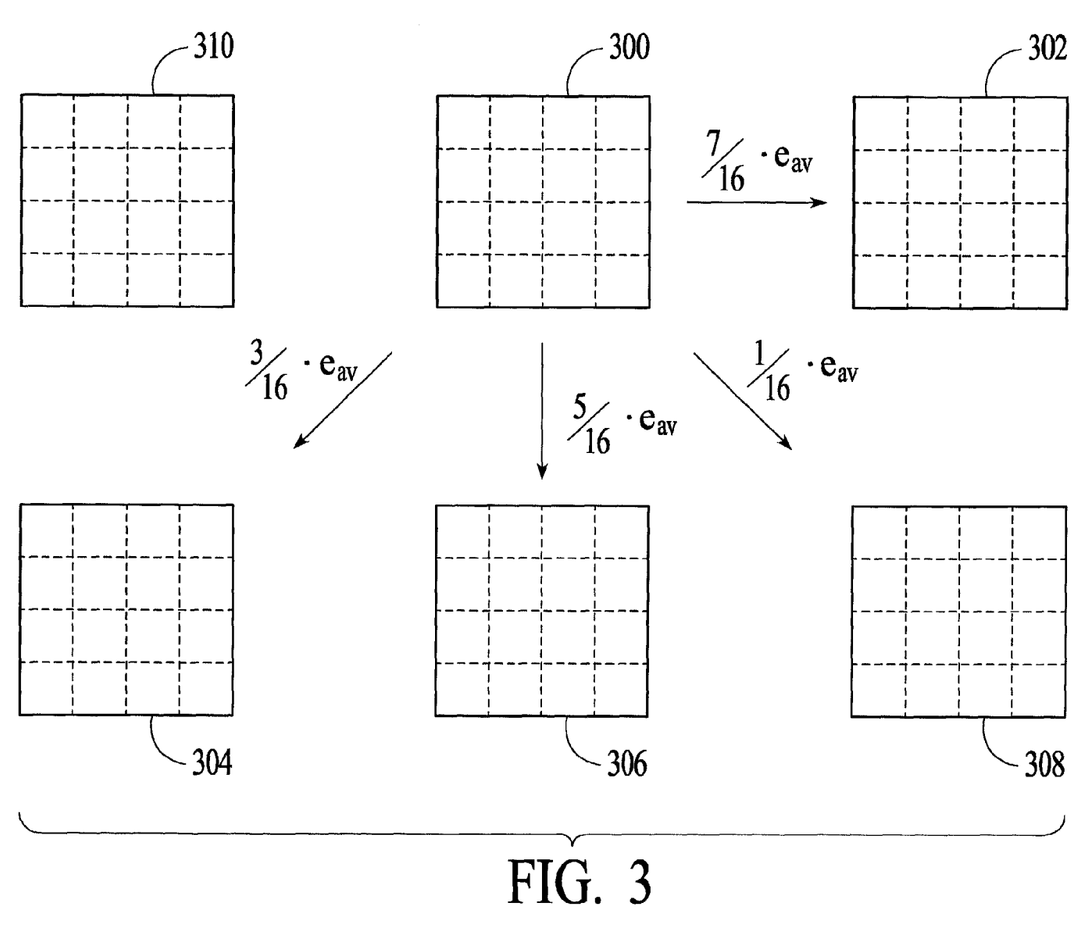
FIG. 3 illustrates an exemplary error diffusion scheme that may be performed by the system of FIG. 1.

FIG. 3 illustrates the manner with which the block error diffusion halftoner 122 distributes halftone errors from a current pixel block 300 to surrounding pixel blocks 302, 304, 306 and 308 in accordance with the exemplary embodiment. For the pixel block 300, the block error diffusion halftoner computes and averages the halftone errors for every pixel within the pixel block 300. If the pixel block 300 is a minority pixel block, the halftone errors are the differences between the values of the inserted dot shape and the underlying grayscale values for the pixel block 300. The average halftone error $e_{av}$ from the pixel block 300 is then distributed to every pixel within the surrounding pixel blocks 302–308. The block error diffusion halftoner distributes $7/16$ of $e_{av}$ to every pixel within the pixel block 302. Similarly, the block error diffusion halftoner distributes $3/16$, $5/16$ and $1/16$ of $e_{av}$ to every pixel within the pixel blocks 304, 306 and 308, respectively.

Since block error diffusion is performed, the current pixel block has been modified with errors diffused from earlier pixel blocks. For example, when pixel block 306 is processed, the pixel block 306 has been modified by errors diffused from the pixel blocks 300, 302, 304 and 310. The pixel block type detector 116 of the system 100 determines whether a current pixel block of the original image 104 is a majority pixel block or a minority pixel block by looking at the intensity values within the current error-modified pixel block and the image pixel block background, i.e., the current input image pixel block without error modifications. The image pixel block background is classified as either a dark background or a light background, depending on the intensity values within the current unmodified input image pixel block. The image pixel block background classification can be made by examining individual intensity values within the pixel block. As an example, if a certain percentage of the intensity values within the input image pixel block are greater than 128, then the image pixel block background is classified as a light background. Otherwise, the image pixel block background is classified as a dark background.

If the current input image pixel block background is classified as a dark background and a majority of pixels within the current error-modified pixel block have an intensity value equal to or greater than 128, then that particular pixel block is defined by the pixel block type detector 116 as a white minority pixel block. A pixel having an intensity value equal to or greater than 128 is defined herein as a "light pixel". In contrast, if the current image pixel block background is classified as a light background and a majority of pixels within current error-modified pixel block have an intensity value less than 128, then that particular pixel block is defined by the pixel block type detector as a black minority pixel block. A pixel having an intensity value less than 128 is defined herein as a "dark pixel". Non-minority pixel blocks are defined by the pixel block type detector as majority pixel blocks.

Figure 2A:
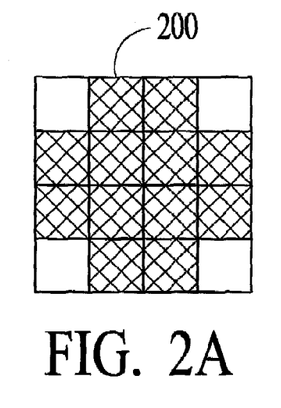
FIGS. 2A–2D are illustrations of exemplary dot shapes for black minority pixel blocks in accordance with the invention.
Figure 2B:
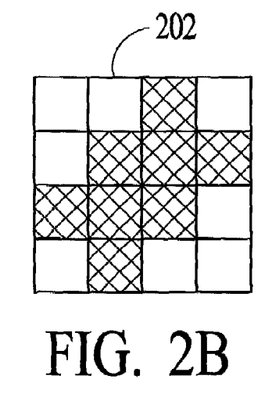
Figure 2C:
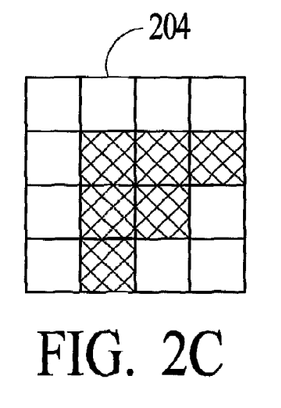
Figure 2D:
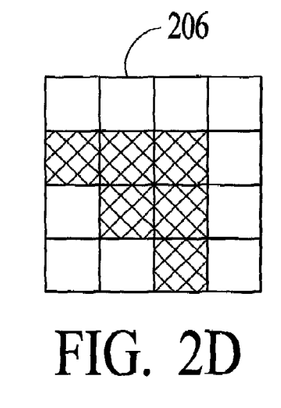
Figure 2E:
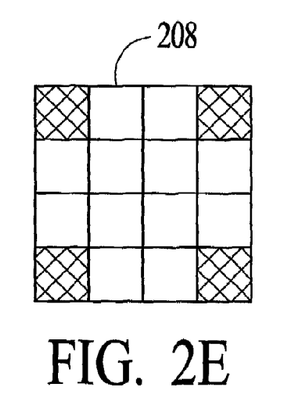
FIGS. 2E–H are illustrations of exemplary dot shapes for white minority pixel blocks in accordance with the invention.
Figure 2F:
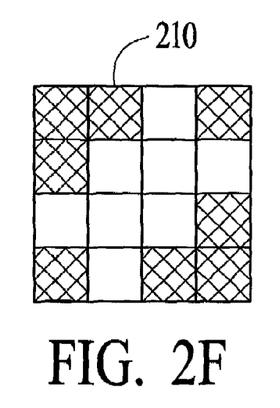
Figure 2G:
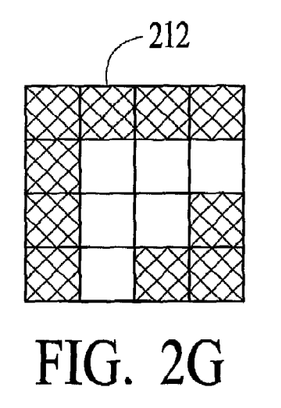
Figure 2H:
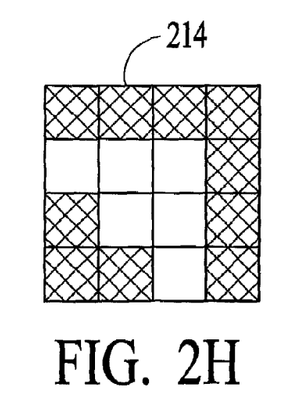

The dot shape selector 118 of the system 100 operates to receive the compressed data stream from the data compressor 114 and then to select appropriate dot shapes to represent the compressed data stream. FIGS. 2A–2D illustrate representative dot shapes that could be used for black minority pixel blocks. In these dot shapes, blank pixels indicate white pixels, while crosshatched pixels indicate black pixels. The dot shape 200 shown in FIG. 2A represents a "zero" within the compressed data stream. The dot shape 202 shown in FIG. 2B represents a "one" within the compressed data stream. The dot shape 204 shown in Fig. C represents a "begin message" to indicate the beginning or start of the compressed data stream. The dot shape 306 shown in FIG. 2D represents an "end message" to indicate the ending or termination of the compressed data stream. The "begin message" and the "end message" are used for synchronization. For white minority pixel blocks, the white and black pixels of the dot shapes 200–206 are reversed, as illustrated in FIGS. 2E–3H. Thus, the dot shapes 208, 210, 212 and 214 represent "zero", "one", "begin message" and "end message", respectively. The representative dot shapes shown in FIGS. 2A–2H are merely examples. A variety of different dot shapes may be utilized in other embodiments without changing the scope of the invention. Further, the number of dot shapes may be greater or fewer in other embodiments of the invention.

The dot shape modulator 120 of the system 100 operates to replace a minority pixel block with an appropriate dot shape selected by the dot shape selector 118. The dot shape modulator replaces a minority pixel block with an appropriate dot shape, since replacing minority pixel blocks with dot shapes are less likely to be noticeable to a viewer than replacing majority pixel blocks with dot shapes.

Turning back to FIG. 1, the dot shape filter 124 of the system 100 operates to examine each pixel block of the image with embedded information 106 to extract the information that is embedded in the image as dot shapes. The dot shape filter identifies the pixel blocks of the image 106 that match the dot shapes, which were used to embed the information into the image. In the exemplary embodiment, the dot shape filter applies a mask to the pixel blocks of the image 106 to detect the dot shapes included in the image. In this embodiment, the mask includes the dot shapes 200–214 of FIGS. 2A–2H to detect the dot shapes in the image 106. As the mask is applied to the image 106, the dot shape filter outputs signals that correspond to the pixel blocks of the image. A high signal indicates a match between the corresponding pixel block of the image 106 and one of the dot shapes 200–214, while a low signal indicates that the corresponding pixel block does not match one of the dot shapes.

The dot shape decoder 126 of the system 100 operates to decode the information embedded in the image 106. The dot shape decoder converts each identified dot shape of the image 106 to a corresponding code, such as "begin message", "one", "zero" or "end message". In this fashion, the dot shapes included in the image with embedded information 106 are decoded to extract the embedded information within the image as a recovered data sequence.

The data decompressor 128 of the system 100 operates to process the recovered data sequence from the dot shape decoder 126 into a format that resembles the information data 102, which was embedded into the original image 104 to produce the image with embedded information 106. The data decompressor decompresses the recovered data sequence using a reverse operation of the data compressor 114 to format the recovered data sequence.

The information embedding operation of the system 100 is described with reference to the flow diagram shown in FIG. 4. At step 402, the original image 104 and the corresponding information data 102 to be embedded are received. Next, at step 404, the received information data is compressed by the data compressor 114 into a compressed data stream. In one embodiment, this compressed data stream is optimized to remove redundant bytes of the information data. At step 406, a pixel block of the original image is selected to be processed. Next, at step 408, a determination is made whether the current pixel block is a white or black minority pixel block by the pixel block type detector 116. If the current pixel block is determined to be a minority pixel block, the process proceeds to step 410, at which an appropriate dot shape is selected by the dot shape selector 118. The appropriate dot shape may be any one of the dot shapes 200–214 of FIGS. 2A–2H, depending on whether the current pixel block is a white minority pixel block or a black minority pixel block. At step 412, the current pixel block is modulated into the selected dot shape by the dot shape modulator 120 in accordance with the compressed data stream. The process then proceeds to step 414, at which block error diffusion halftoning is performed on the current pixel block by the block error diffusion halftoner 122.

In one embodiment, the minority pixel blocks of the original image 104 are modulated such that the first minority pixel block is replaced by one of the dot shapes 204 and 212, which represents the label "begin message." Subsequent minority pixel blocks of the original image are then modulated such that each minority pixel block is replaced by one of the dot shapes 200, 202, 208 and 210, which represent "ones" and "zeros", in accordance with the compressed data stream. After the compressed data stream has been represented by the minority pixel blocks of the original image, the next minority pixel block is modulated such that the pixel block is replaced by one of the dot shapes 206 and 214, which represent the label "end message." This message sequence of "begin message", "ones", "zeros" and "end message" may be repeated by modulating additional minority pixel blocks of the original image.

Returning back to step 408, if the current pixel block is determined to a non-minority pixel block, i.e., a majority pixel block, the process proceeds to step 414, at which the halftone errors of the current pixel block is diffused to neighboring pixel blocks by the block error diffusion halftoner 122. Next, at step 416, a determination is made whether the current pixel block is the last pixel block of the original image 104. If the current pixel block is the last pixel block of the original image, the process comes to an end. However, if the current pixel block is not the last pixel block of the original image, the process proceeds back to step 406, at which the next pixel block of the original image is selected to be processed. In this fashion, the system 100 embeds the information data 102 into the minority pixel blocks of the original image 104 to produce the image with embedded information 106.

The information retrieving operation of the system 100 is described with reference to the flow diagram shown in FIG. 5. At step 502, the image with embedded information 106 is received. If the image with embedded information is not in an electronic format, the received image is scanned by a scanner (not shown) of the system 100 to convert the image into an electronic format, at step 504. However, if the received image is in an electronic format, then the process proceeds directly to step 506. At step 506, a pixel block of the image is selected to be processed. Next, at step 508, shape filtering is applied to the current pixel block of the image by the dot shape filter 124 to determine whether the current pixel block matches one of the dot shapes, which may represent a part of the embedded information in the image 106. At step 510, a high or low signal is generated by the dot shape filter 124 to indicate whether there is match or not. A high signal indicates that the current pixel block matches one of the dot shapes, while a low signal indicates that the current pixel block does not match any dot shape. Next, at step 512, a determination is made whether the signal is a high signal.

If the signal is a high signal, the process proceeds to step 514, at which the current pixel block is decoded to a code that corresponds to the matched dot shape to form a part of a recovered data sequence. However, if the signal is a low signal, the process bypasses step 514 and proceeds directly to step 516. At step 516, a determination is made whether the current pixel block of the image 106 is the last pixel block. If so, the process proceeds to step 518, at which the recovered data sequence is decompressed and then the process comes to an end. However, if the current pixel block is not the last pixel block of the image 106, the process proceeds back to step 506, at which a next pixel block of the image is selected to be processed. In this fashion, the system 100 retrieves the information embedded in the image 106.

Figure 4:
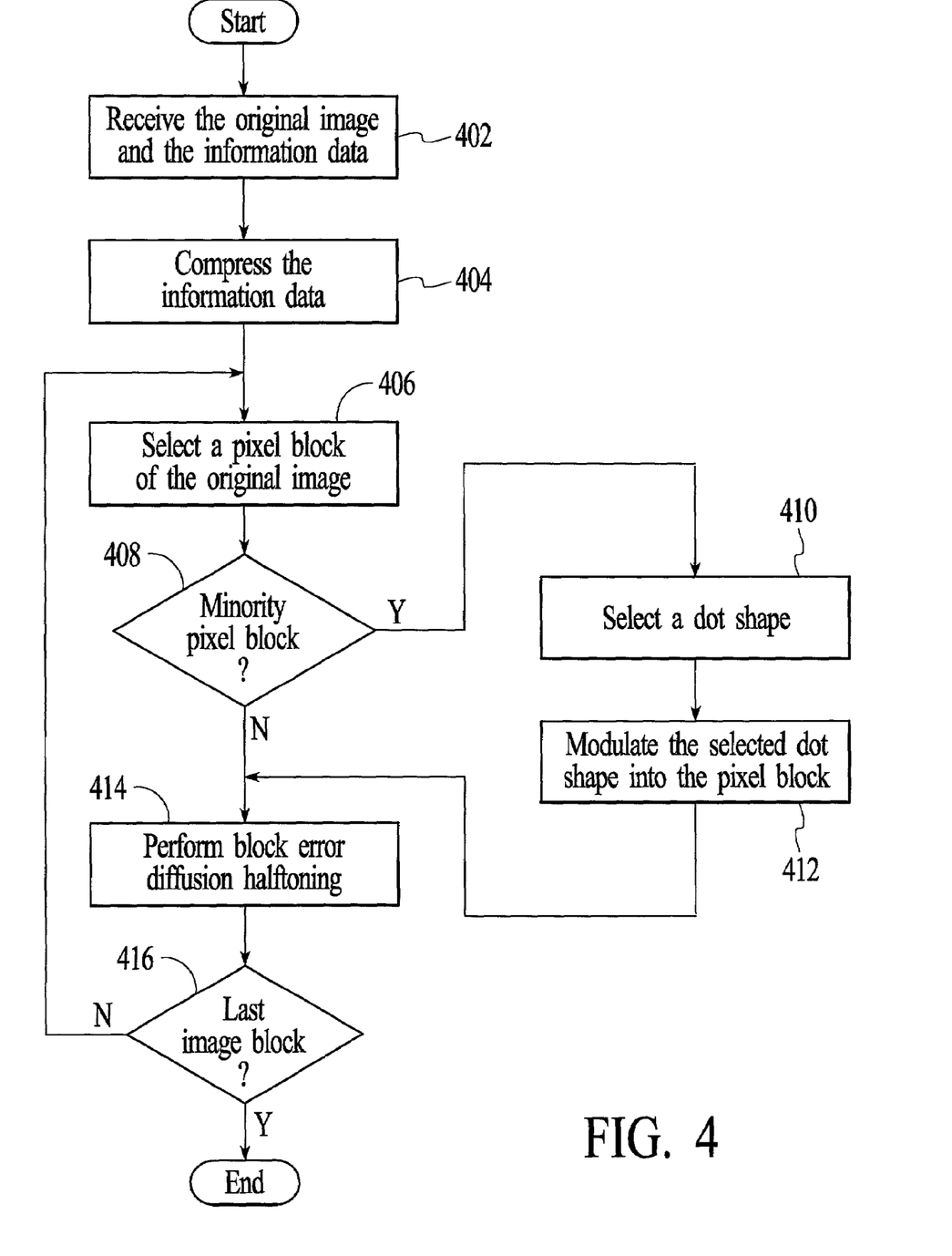
FIG. 4 is a process flow diagram of the information embedding operation of the system of FIG. 1.
Figure 5:
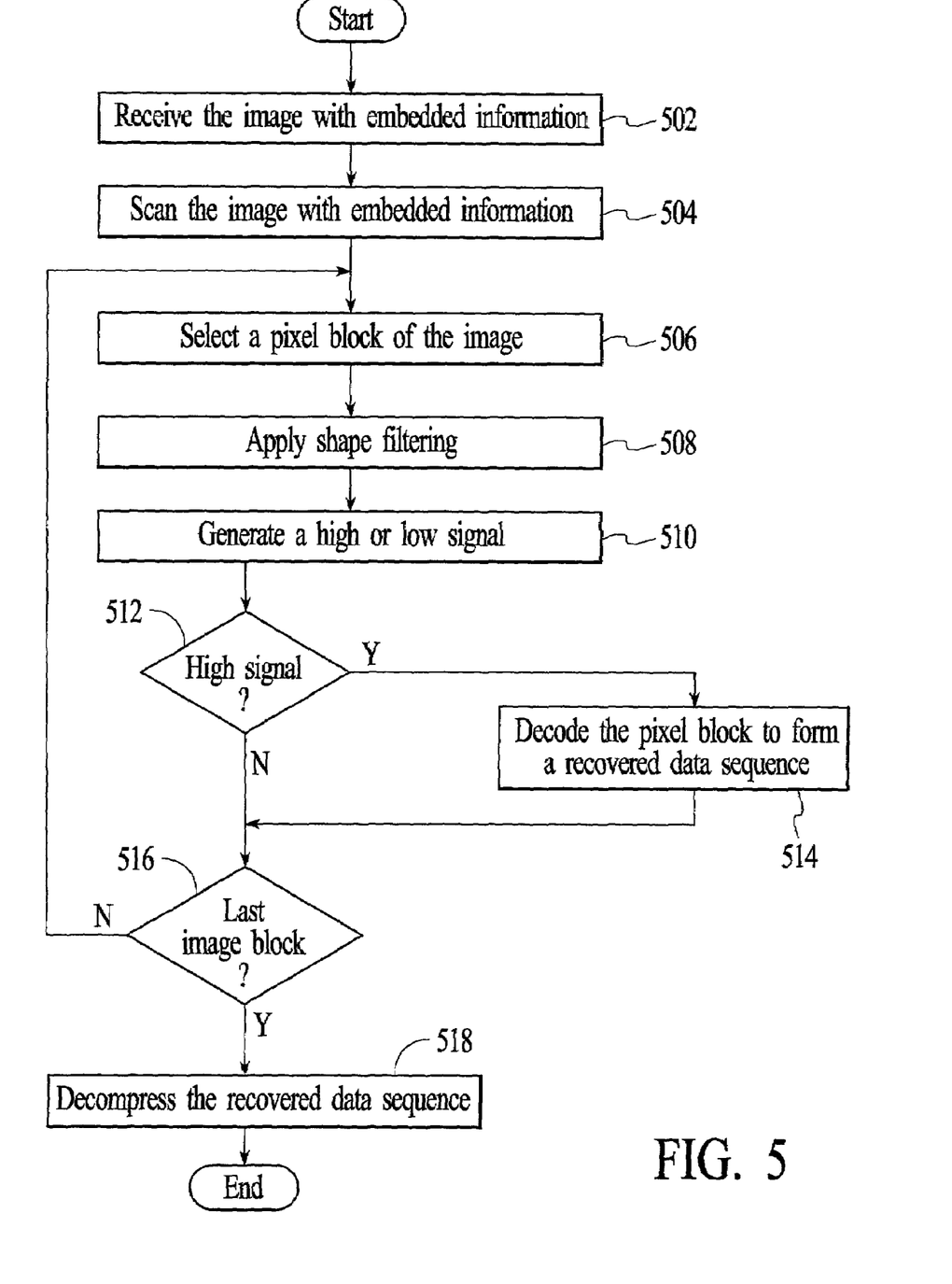
FIG. 5 is a process flow diagram of the information retrieving operation of the system of FIG. 1.

The flow diagrams as depicted in FIGS. 4 and 5 are merely one embodiment of the invention. In other embodiments, one or more of the described steps of the flow diagrams may be deleted and/or combined. Furthermore, in other embodiments, these steps may be performed in different sequences.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of embedding information in images comprising:
    detecting first type pixel blocks of an input image, each of said first type pixel blocks including a plurality of pixels, said first type pixel blocks being dependent on pixel values within said first type pixel blocks; and
    modulating said first type pixel blocks of said input image based on said information to produce an output image, said output image including said input image and said information.

2. The method of claim 1 wherein said step of detecting said first type pixel blocks of said input image includes detecting minority pixel blocks of said input image, said minority pixel blocks being pixel blocks that include a majority of pixels that contrast with an image background.

3. The method of claim 2 wherein said minority pixel blocks include a majority of dark pixels.

4. The method of claim 2 wherein said minority pixel blocks includes a majority of light pixels.

5. The method of claim 1 further comprising a step of diffusing halftone errors of each pixel block of said input image into neighboring pixel blocks of said input image on a pixel block by pixel block basis.

6. The method of claim 1 wherein said step of modulating said first type pixel blocks of said input image includes replacing said first type pixel blocks of said input image with dot shape blocks such that said information is represented by said dot shape blocks.

7. The method of claim 6 wherein sonic of said dot shape blocks represents synchronization data.

8. The method of claim 6 wherein some of said dot shape blocks represents binary data.

9. A system for embedding information in images comprising:
- a pixel block type detector that is configured to detect first type pixel blocks of an input image, each of said first type pixel blocks including a plurality of pixels, said first type pixel blocks being dependent on pixel values within said first type pixel blocks; and
- a block modulator that is configured to modulate said first type pixel blocks of said input image based on said information to be embedded to produce an output image, said output image including said input image and said information.

10. The system of claim 9 wherein said pixel block type detector is configured to detect minority pixel blocks of said input image, said minority pixel blocks being pixel blocks that include a majority of pixels that contrast with an image background.

11. The system of claim 10 wherein said minority pixel blocks include a majority of dark pixels.

12. The system of claim 10 wherein said minority pixel blocks includes a majority of light pixels.

13. The system of claim 9 further comprising an error diffusion halftoner coupled to said block modulators said error diffusion halftoner being configured to diffuse halftone errors of each pixel block of said input image into neighboring pixel blocks of said input image on a pixel block by pixel block basis.

14. The system of claim 9 wherein said block modulator is configured to replace said first type pixel blocks of said input image with dot shape blocks such that said information is represented by said dot shape blocks.

15. The system of claim 14 wherein some of said dot shape blocks represents synchronization data.

16. The system of claim 14 wherein some of said dot shape blocks represents binary data.

17. A method of embedded information in images comprising:
- detecting first type pixel blocks of an input image, each of said first type pixel blocks including a plurality of pixels, said first type pixel blocks being dependent on pixel values within said first type pixel blocks;
- modulating said first type pixel blocks of said input image based on said information to produce an output image, said output image including said input image and said information; and
- converting pixels of said input image into halftones, including diffusing halftone errors associated with said first type pixel blocks to neighboring pixel blocks of said first type pixel blocks on a block-by-block basis.

18. The method of claim 17 wherein said first type pixel blocks of said input image include minority pixel blocks, said minority pixel blocks being pixel blocks that, include a majority of pixels that contrast with an image background.

19. The method of claim 18 wherein said minority pixel blocks include a majority of dark pixels.

20. The method of claim 18 wherein said minority pixel blocks includes a majority of light pixels.

21. The method of claim 17 wherein said step of modulating said first type pixel blocks of said input image includes replacing said first type pixel blocks of said input image with dot shape blocks such that said information is represented by said dot shape blocks.

* * * * *

UNITED STATES PATENT AND TRADEMARK OFFICE
CERTIFICATE OF CORRECTION

PATENT NO.         : 7,187,806 B2
APPLICATION NO. : 09/935457
DATED                : March 6, 2007
INVENTOR(S)      : Niranjan Damera-Venkata Page 1 of 1

It is certified that error appears in the above-identified patent and that said Letters Patent is hereby corrected as shown below:

In column 9, line 4, in Claim 7, delete "sonic" and insert -- some --, therefor.

In column 9, line 30, in Claim 13, delete "modulators" and insert -- modulator, --, therefor.

In column 10, line 24, in Claim 18, delete "that," and insert -- that --, therefor.

Signed and Sealed this

Twenty-fourth Day of November, 2009

David J. Kappos
*Director of the United States Patent and Trademark Office*